Nov. 15, 1927.                                               1,649,781
J. L. KOPF
APPARATUS FOR TREATING A MIXTURE SUCH AS CHAFF AND CRACKED COFFEE
Filed Nov. 1, 1926        2 Sheets-Sheet 2
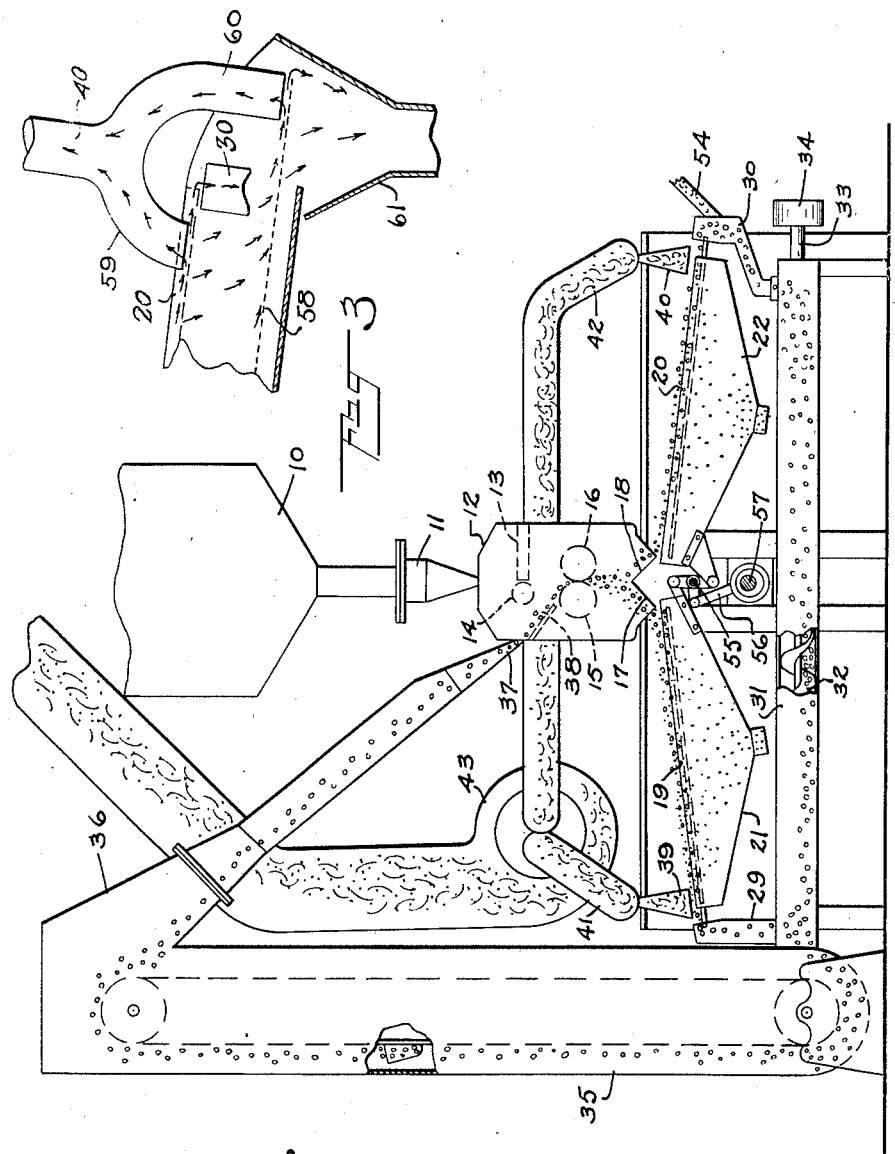
INVENTOR.
JOSEPH L. KOPF.
BY Julian S. Wooster.
ATTORNEYS.

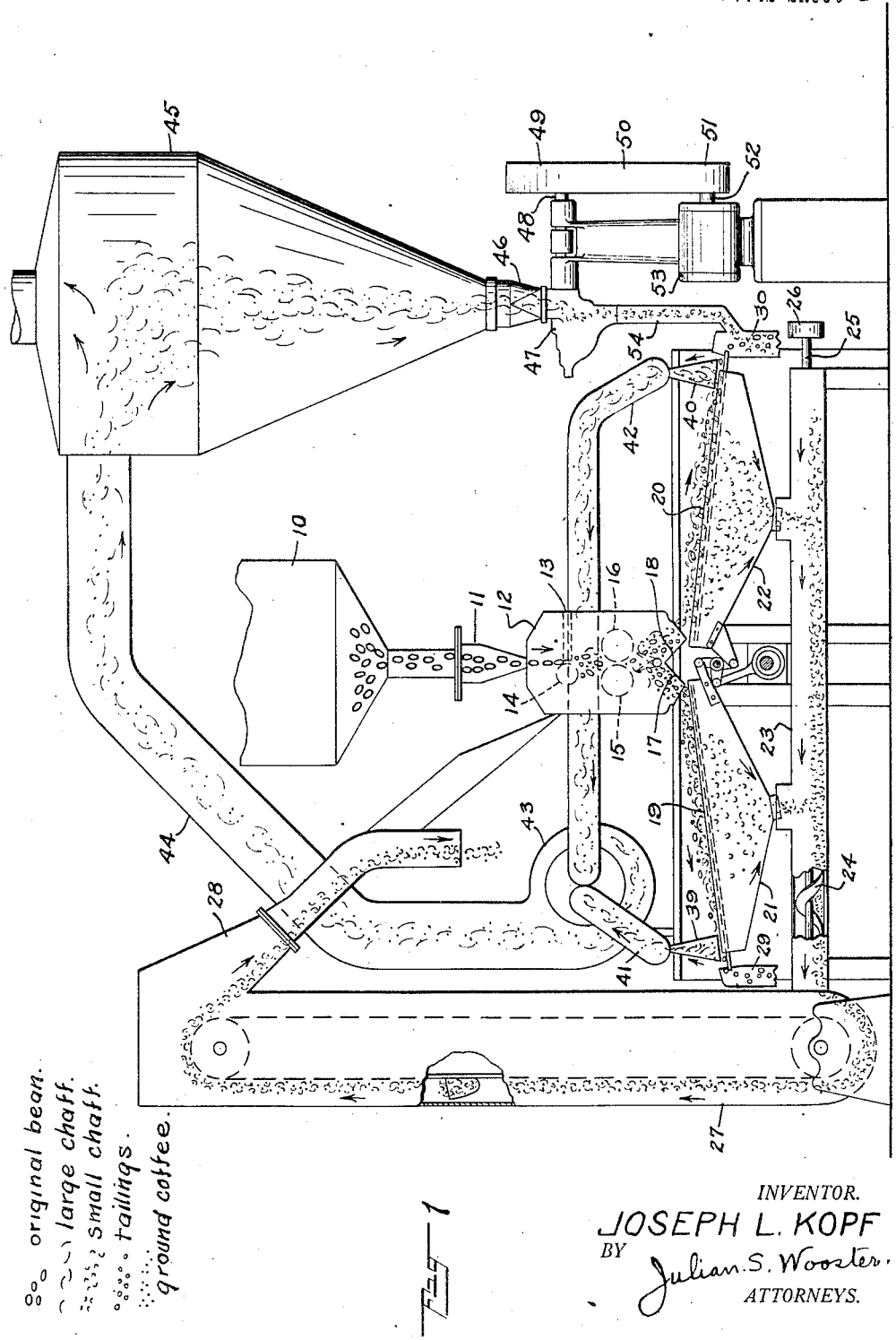

Patented Nov. 15, 1927.

1,649,781

UNITED STATES PATENT OFFICE.

JOSEPH L. KOPF, OF EAST ORANGE, NEW JERSEY, ASSIGNOR TO JABEZ BURNS & SONS, INC., OF NEW YORK, N. Y., A CORPORATION OF NEW YORK.

APPARATUS FOR TREATING A MIXTURE SUCH AS CHAFF AND CRACKED COFFEE.

Application filed November 1, 1926. Serial No. 145,417.

This invention relates to apparatus for treating a mixture such as coarse chaff and cracked coffee to produce a uniform comminuted mixture of the same, in a more simple and efficient manner than has heretofore been known. A further object of the invention is to provide an automatic combination of apparatus wherein the rate of production of the uniform finished comminuted product will be substantially the same as the rate at which the raw material such as roasted coffee beans, or what is known in the trade as cracked coffee and chaff, is fed into the machine. At the present time chaff is regarded by many people as objectionable in prepared comminuted coffee, particularly cut coffee, and many manufacturers in order to remove the objection to coarse chaff in prepared coffee go to considerable expense and trouble to remove and throw it away. If not removed from prepared coffee it makes a non-homogeneous mixture which tends to stratify and becomes non-uniform, both by storage in bins in the plant, as well as in the small containers put up for the retail trade. When the chaff is prepared to a degree of fineness proportioned to the degree of fineness of the coffee and mixed therewith in the usual proportion occurring in the coffee bean, not only is a homogeneous and non-stratifying mixture produced, but the mixture has advantages giving improved cup qualities when infused.

The invention generally comprises means for separating coarse chaff and coffee from each other and from the fines, then separately comminuting the coffee and chaff to a desired fineness, and then finally mixing same with the fines first recovered, so that the entire operation proceeds automatically and results, after the machine has once been started, in a uniform product having the desirable qualities above mentioned. In a preferred form of the apparatus, the comminuted coffee and chaff are returned to the original separating means and those portions of the desired finished fineness will pass therethrough, but otherwise will again be transferred through their respective comminuting devices until they are of the desired fineness. By separating the coarse chaff from the coffee and separately comminuting it there is avoided the clogging up of the coffee comminuting apparatus where it is attempted to comminute the chaff and the coffee together to finished fineness.

The drawings illustrate an apparatus designed for the continuous treatment of coffee beans and the handling of the chaff in the manner generally described above. In these drawings Fig. 1 is a diagrammatic layout of the apparatus principally showing the course taken by the finished product.

Fig. 2 is a similar view showing the course taken by the coarser material through the apparatus.

Fig. 3 is a partial diagrammatic view of a modified form of the apparatus in which two sets of screens are used.

In the apparatus as illustrated a hopper 10 contains coffee beans and is connected by a spout 11 to a casing 12 containing a cracker bar 13 and roll 14 and finishing rolls 15 and 16 therebelow. Beneath the finishing rolls are baffle plates 17 and 18 deflecting the comminuted material to a pair of screens 19 and 20. Beneath these screens are casings 21 and 22 connecting to a conveyor 23 operated by a screw 24 on shaft 25 having a belt pulley 26 at one end. This conveyor connects at one end to a bucket elevator 27 which carries the product upwardly to a conduit 28 leading to a storage bin not shown.

Disposed at the lower ends of the screens 19 and 20 are conduits 29 and 30, connecting to a conveyor pipe 31 containing a screw 32 mounted on a shaft 33 having a belt pulley 34 at one end; the other end of the conveyor 31 connects to a bucket elevator 35 which at its upper end connects with conduit 36 having at its end 37 a spout leading into casing 12. Within the casing 12 is a deflector plate 38 extending from the end of spout 37 to a point above the finishing rolls 15 and 16.

Disposed above but closely adjacent to the lower end surface of screens 19 and 20 are hoods 39 and 40 connected to pipes 41 and 42 leading to a fan 43 operated by any suitable means not shown. The fan casing is connected to a conduit 44 leading to a separator 45. The separator casing at its lower end 46 is connected to a comminuting device 47 of any desired type, shaft 48 of which is provided with a belt pulley 49 carrying a belt 50 connected to a pulley 51 on the shaft 52 of a motor 53. This same motor may be and preferably is connected to drive not only the fan 43, but the conveyor shafts 25 and 33.

The lower end of the comminuting device 47 is connected by a conduit 54 to the conduit 30.

The screens 19 and 20 may be rapidly vibrated by being connected to a rocker arm 55 operated from an eccentric arm 56 mounted on shaft 57 which is driven from any source of power such as the motor 53.

In the form of the invention shown in Fig. 3, which only represents one side of the screening device, an auxiliary screen 58 is disposed below the main screen 20. Similarly on the other side of the device another auxiliary screen will be located beneath the main screen 19. In this modification the suction hood 40 is now split into two parts 59 and 60, one disposed adjacent the end of the screen 20 and the other adjacent the end of the screen 58. The lower screen 58 connects at its lower end with conduit 61 leading to the conveyor 23, whereas screen 20 in the manner above described connects to the conduit 30 leading to the conveyor 31.

In the operation of the apparatus the power is applied to start the fan 43, the elevators 27 and 35, the conveyors 23 and 31, the screen vibrating shaft 57, the comminuting rolls 14, 15 and 16, and the auxiliary comminuting device 47. These moving parts are preferably connected up by suitable belt or gears not shown, to one common power source such as the motor 53 and are so regulated in their speed as to continually handle the product as it passes through the apparatus to keep the product moving in a uniform manner through the apparatus.

The coffee beans in the hopper 10 are fed through spout 11 to the casing 12 between cracker bar and roll 13 and 14 and then through the finishing rolls 15 and 16, thus being given a preliminary comminution. The material is then deflected by the plates 17 and 18 on to the screens 19 and 20. The fine chaff and coffee will pass through the screens into the casings 21 and 22 and then to the conveyor 23 which conducts it to the elevator 27 where it is lifted to the conduit 28 passing therethrough to a storage bin. The coarse chaff and coffee will pass down the surface of the screens 19 and 20 and the chaff and any of the fine coffee which may reach the lower portion of the screens without passing through, will be drawn up through hoods 39 and 40 and through the conduit 44 to the collector 45 where the air is removed. The chaff and fine coffee will drop through the casing 46 into the auxiliary comminuting device 47 where it is ground by itself much finer than it would ordinarily be ground when it is mixed with the larger mass of coffee in the main apparatus. The fine coffee passing through this auxiliary comminuting device with the chaff becomes coated on the surface of the chaff to hide its light color and the chaff thus acts as well as a carrier for the fine coffee to disguise its abnormally fine condition. This separately and additionally comminuted material then passes through the conduit 54 to the conduit 30 which leads it to the tailings conveyor 31 where it mixes with the coarse tailings of the comminuted coffee and is passed through the conveyor to the bucket elevator 35. This elevator passes it to the conduit 36 through which it drops through the spout 37 into the casing 12 on to deflector plate 38 which leads it to the finishing rolls 15 and 16, thus subjecting it to an additional comminution with the main body of material.

The main material, together with the separately comminuted chaff and fine coffee then pass again on to the screens and if fine enough will pass through to the finished goods conveyor to be transferred to the suitable bins.

In the modification shown in Fig. 3, it is desired to remove from the comminuted coffee all of the chaff and for this reason two screens are provided in each set. The first screen will classify the coarse from the fine material and will remove from the coarse material the chaff through the hood 59. The tailings will pass as usual down this screen to conduit 30, shown in Figs. 1 and 2. The fine coffee and chaff will pass through the screen 20 on to the screen 58. Here a further classification takes place separating the extra fine coffee which passes through the screen 58 causing the remainder to pass down the screen at the lower end of which the hood 60 draws up the fine chaff remaining in the comminuted material and passes it up through the pipe 42 to be transferred as above mentioned, to the auxiliary comminution device 47.

It will thus be observed that the coarse chaff is removed from the material without becoming mixed with the finished goods and is then given a separate comminution either alone or with some of the fine coffee to reduce it to a size more in accordance with the size of the comminuted grains of coffee, after which it is passed back automatically into the system to be screened again before it mixes with the finished goods.

I claim:

1. Apparatus for treating a mixture of coarse chaff and cracked coffee comprising the combination of means for separating the coarse from the fine portions of said mixture, means for discharging the fine material, means for separating the coarse chaff from the coarse coffee, separate chaff and coffee comminuting means, means for separately conducting the coarse chaff and coarse coffee to their respective comminuting means, means for separating the resulting fine material, and means for mixing said resulting fine material with the first produced fine material.

2. Apparatus for treating a mixture of coarse chaff and cracked coffee comprising the combination of means for separating the coarse from the fine portions of said mixture, means for discharging the fine material, pneumatic means for separating the coarse chaff from the coarse coffee, separate chaff and coffee comminuting means, means for separately conducting the coarse chaff and coarse coffee to their respective comminuting means, means for separating the resulting fine material, and means for mixing said resulting fine material with the first produced fine material.

3. An apparatus for treating a mixture such as coarse chaff and cracked coffee comprising the combination of means for separating the coarse chaff, means for discharging the coarse chaff into a chaff comminuting means, means for comminuting the chaff, means for separating coarse from fine coffee, and conveying means receiving the comminuted chaff and the fine coffee.

4. Apparatus for treating a mixture of coarse chaff and cracked coffee comprising the combination of means for separating the coarse from the fine portions of said mixture, means for discharging the fine material, means for separating the coarse chaff from the coarse coffee, separate chaff and coffee comminuting means, means for separately conducting the coarse chaff and coarse coffee to their respective comminuting means, means for separating the resulting fine material, means for mixing said resulting fine material with the first produced fine material, said various means being so corelated and operated as to automatically produce finished fine material at substantially the same rate as the coarse mixture is supplied to the apparatus.

5. Apparatus for treating a mixture such as coarse chaff and cracked coffee comprising the combination of means for separating the fine from the coarse portions of the mixture, means for removing the coarse chaff from the coarse coffee, a chaff comminuting device connected to the removing means, and means connected to the comminuting device for returning the comminuted chaff to the fine portion of the mixture.

6. Apparatus for treating a mixture such as coarse chaff and cracked coffee comprising the combination of means for separating the fine from the coarse portions of the mixture, means for removing the chaff from the coarse coffee, means connected to the removing means for comminuting the chaff, means connected to the separating means for comminuting the coarse coffee, and separate conveying means connected to the coffee and chaff comminuting means for returning the comminuted coffee and chaff to the fine portion.

7. Apparatus for treating a mixture such as coarse chaff and cracked coffee, comprising pneumatic means for removing the chaff from the mixture, a chaff comminuting device connected to the pneumatic means and a conduit connected to the comminuting device for returning the chaff to the separated coffee.

8. Apparatus for treating a mixture such as coarse chaff and cracked coffee comprising a screen over which the mixture is passed to separate the fine portions from the coarse portions, pneumatic means associated with the screen for removing the coarse chaff from the coarse coffee, a chaff comminuting device connected to the pneumatic means and a conduit connected to the chaff comminuting device for returning the chaff to the separated coffee.

9. Apparatus for treating a mixture such as coarse chaff and cracked coffee comprising a screen over which the mixture is passed to separate the fine portions from the coarse portions, pneumatic means associated with the screen for removing the coarse chaff from the coarse coffee, a chaff comminuting device connected to the pneumatic means and a conduit connected to the chaff comminuting device for returning the chaff to the screen.

10. Apparatus for treating a mixture such as coarse chaff and cracked coffee comprising a screen for separating the coarse from the fine portions of the mixture, a conduit associated with the screen to transfer the fine material to storage bins, means associated with the screen to receive the coarse coffee therefrom and comminute it, a pneumatic device associated with the screen for drawing the coarse chaff therefrom, a chaff comminuting device connected to the pneumatic device for receiving the comminuted chaff, and separate means associated with both the coffee and the chaff comminuting devices for mixing the separately comminuted coffee and chaff.

11. Apparatus for treating a mixture such as coarse chaff and cracked coffee comprising a pair of screens disposed one above the other, the upper screen receiving the mixture and separating the coarse from the fine portions thereof, the lower screen receiving the fine portions of chaff and coffee and adapted to pass only the fine portions of the coffee, a pneumatic device associated with the lower end of each screen to draw the chaff therefrom, a chaff comminuting device connected with the pneumatic device to receive the chaff and separately comminute it, and means connected to the chaff comminuting device for returning the comminuted chaff to the separated coffee.

Signed at New York, in the county of New York, and State of New York this 29 day of Oct. A. D. 1926.

JOSEPH L. KOPF.